(12) United States Patent
Rodriguez et al.

(10) Patent No.: US 12,452,035 B1
(45) Date of Patent: Oct. 21, 2025

(54) METHODS AND SYSTEMS FOR MAINTAINING FIDELITY OF A BOND BETWEEN A PERSON AND AN ARTIFICIAL INTELLIGENCE AGENT

(71) Applicant: Daon Technology, Douglas (IM)

(72) Inventors: Raphael A. Rodriguez, Marco Island, FL (US); Thomas Grissen, Naples, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 19/245,204

(22) Filed: Jun. 20, 2025

(51) Int. Cl.
*H04L 9/06* (2006.01)
*G06N 20/00* (2019.01)
*H04L 9/00* (2022.01)

(52) U.S. Cl.
CPC ........... *H04L 9/0643* (2013.01); *G06N 20/00* (2019.01); *H04L 9/50* (2022.05)

(58) Field of Classification Search
CPC .......... H04L 9/0643; H04L 9/50; G06N 20/00
See application file for complete search history.

(56) References Cited

U.S. PATENT DOCUMENTS

| | | | | |
|---|---|---|---|---|
| 2022/0094709 A1* | 3/2022 | Sharma | ............... | G06F 18/2415 |
| 2023/0075065 A1* | 3/2023 | Ivenso | ................... | G06N 20/00 |
| 2023/0376961 A1* | 11/2023 | Nair | ..................... | G06Q 20/382 |
| 2024/0144082 A1* | 5/2024 | Tarapov | ................. | G06N 20/00 |
| 2025/0045413 A1* | 2/2025 | Sahin | .................... | G06F 21/563 |
| 2025/0077950 A1* | 3/2025 | David | .................... | G06N 3/045 |
| 2025/0209157 A1* | 6/2025 | Neuhof | ................. | G06N 20/00 |
| 2025/0217673 A1* | 7/2025 | Silver | .................... | G06N 20/00 |
| 2025/0247454 A1* | 7/2025 | Bliner | ................ | G06Q 30/0203 |
| 2025/0259085 A1* | 8/2025 | Crabtree | ............... | G06F 21/602 |

* cited by examiner

*Primary Examiner* — Taghi T Arani
*Assistant Examiner* — Blake I Narramore
(74) *Attorney, Agent, or Firm* — Kevin McDermott, Esq.

(57) ABSTRACT

A method of maintaining fidelity of a bond between a person and an artificial intelligence agent bound to the person includes capturing data for behavioral modalities of a person, calculating a score for each behavioral modality, calculating a similarity score from the calculated scores, and comparing the similarity score against the threshold value. In response to determining the similarity score fails to satisfy the threshold value, the method substitutes a snapshot of a Baseline Persona Model of the person for the Baseline Persona Model. The Baseline Persona Model is a machine learning model that encodes the behavioral modality data of a person over time. The snapshot is a copy of the Baseline Persona Model at an instant in time. Subsequently data for the behavioral modalities of the person is captured over time. The Baseline Persona Model is retrained using a set of the subsequently captured data approved by the person.

17 Claims, 3 Drawing Sheets

METHODS AND SYSTEMS FOR MAINTAINING FIDELITY OF A BOND BETWEEN A PERSON AND AN ARTIFICIAL INTELLIGENCE AGENT

BACKGROUND OF THE INVENTION

This invention relates generally to artificial intelligence-based digital assistants, and more specifically to methods and systems for maintaining fidelity of a bond between a person and an artificial intelligence agent.

Artificial intelligence powered assistants and chatbots have been increasingly employed to perform a broad range of digital tasks on behalf of individuals like calendar management, email composition, transaction authorization, and data retrieval. Conventionally, such assistants are bound to a person's identity via a one-time enrollment procedure, for example, password authentication, physical token validation, or biometric authentication. Once bound, the assistant typically relies on this static credential binding or, at best, periodic re-authentication to maintain trust.

However, such static and periodic mechanisms are known to be vulnerable to session hijacking, credential compromise, and deepfake attacks that can circumvent one-time or scheduled re-verification checks. Moreover, such systems are typically not updated to account for changes in a person's behavioral characteristics which evolve over time. Such behavioral changes are known as behavioral drift. Existing artificial intelligence assistants typically lack robust, real-time mechanisms to detect changes in a person's behavioral characteristics. As a result, such systems are known to operate on outdated or corrupted data which can expose systems to unauthorized actions or require overly aggressive re-authentication policies that degrade user experience with excessive interruptions.

Efforts to address behavioral drift in conventional systems typically involve manual retraining workflows or infrequent batch updates. These approaches introduce latency between drift detection and model correction, incur significant administrative overhead, and risk human error in retraining outcomes. Moreover, current governance frameworks often fail to provide fine-grained, tamper-evident audit trails that link each agent action to an authorized human owner, complicating compliance with regulatory requirements and auditor demands.

Thus, it would be advantageous and an improvement over the relevant technology to provide a method, an electronic device and a computer readable recording medium capable of enhancing detection of behavioral changes in people to enhance security against spoofing and drift-related errors while preserving a seamless experience for people, thereby enabling deployment of artificial intelligence assistants for critical operations with confidence in ongoing identity binding and trustworthiness.

BRIEF DESCRIPTION OF THE INVENTION

An aspect of the present disclosure provides a method for maintaining fidelity of a bond between a person and an artificial intelligence agent bound to the person that includes capturing, by an electronic device, data for behavioral modalities of a person, calculating a score for each behavioral modality, calculating a similarity score from the calculated scores, and comparing the similarity score against the threshold value. In response to determining the similarity score fails to satisfy the threshold value, the method substitutes a snapshot of a Baseline Persona Model of the person for the Baseline Persona Model. The Baseline Persona Model is a machine learning model that encodes the behavioral modality data of a person over time. The snapshot is a copy of the Baseline Persona Model at an instant in time. Moreover, the method includes subsequently capturing data for the behavioral modalities of the person over time and retraining, using a set of the subsequently captured data approved by the person, the Baseline Persona Model.

In an embodiment of the present disclosure the behavioral modalities includes at least one of keystroke dynamics, mouse movement, language style embeddings derived from textual inputs of the person, and voice print features of the person.

In another embodiment of the present disclosure the method further includes generating a cryptographic hash of the snapshot for each biometric modality of the person, wherein the cryptographic hash is associated with metadata. The method further includes signing the cryptographic hash within a hardware security module and writing the signed cryptographic hash and associated metadata to an Immutable Ledger. The Immutable Ledger is a permissioned blockchain accessible to authorized auditors.

In yet another embodiment of the present disclosure the method further includes notifying the person when the similarity score fails to satisfy the threshold value and upon initiation of the retraining step.

In yet another embodiment of the present disclosure the notifying step includes delivering the notification via at least one of an in-application dashboard alert, an email message, or a short message service associated with the person.

In yet another embodiment of the present disclosure the threshold value is a statistical deviation of two standard deviations from a mean of the Baseline Persona Model.

In yet another embodiment of the present disclosure the method further includes reviewing, by the person, the subsequently captured behavioral modality data. In response to the person approving the subsequently captured behavioral data, incorporating the subsequently captured behavioral modality data into a retraining routine to create an updated behavioral modality record for the person.

Another aspect of the present disclosure provides a non-transitory computer-readable recording medium in an electronic device for maintaining the fidelity of a bond between a person and an artificial intelligence agent bound to the person. The non-transitory computer-readable recording medium stores instructions which when executed by a hardware processor performs the steps of the methods described above.

Yet another aspect of the present disclosure provides an electronic device for maintaining the fidelity of a bond between a person and an artificial intelligence agent bound to the person. The electronic device includes a processor and a memory configured to store data. The electronic device is associated with a network and the memory is in communication with the processor and has instructions stored thereon which, when read and executed by the processor, cause the electronic device to capture data for behavioral modalities of a person, calculate a score for each behavioral modality, calculate a similarity score from the calculated scores, and compare the similarity score against the threshold value.

In response to determining the similarity score fails to satisfy the threshold value, the instructions, when read and executed by the processor, cause the electronic device to substitute a snapshot of a Baseline Persona Model of the person for the Baseline Persona Model. The Baseline Persona Model is a machine learning model that encodes the behavioral modality data of a person over time. The snapshot is a copy of the Baseline Persona Model at an instant in time. The instructions, when read and executed by the processor, cause the electronic device to subsequently capture data for the behavioral modalities of the person over time and retrain, using a set of the subsequently captured data approved by the person, the Baseline Persona Model.

In an embodiment of the present disclosure, the behavioral modalities include at least one of keystroke dynamics, mouse movement, language style embeddings derived from textual inputs of the person, and voice print features of the person.

In another embodiment of the present disclosure, the instructions when read and executed by the processor, further cause the electronic device to generate a cryptographic hash of the snapshot for each biometric modality of the person. The cryptographic hash is associated with metadata. Moreover, the instructions when read and executed by the processor, further cause the electronic device to sign the cryptographic hash within a hardware security module and write the signed cryptographic hash and associated metadata to an Immutable Ledger. The Immutable Ledger is a permissioned blockchain accessible to authorized auditors.

In yet another embodiment of the present disclosure, the instructions when read and executed by the processor, further cause the electronic device to notify the person when the similarity score fails to satisfy the threshold value and upon initiation of the retraining step.

In yet another embodiment of the present disclosure, the instructions when read and executed by the processor, further cause the electronic device to deliver the notification via at least one of an in-application dashboard alert, an email message, or a short message service associated with the person.

In yet another embodiment of the present disclosure, wherein the threshold value is a statistical deviation of two standard deviations from a mean of the Baseline Persona Model.

In yet another embodiment of the present disclosure, the instructions when read and executed by the processor, further cause the electronic device to present the subsequently captured behavioral modality data for review by the person. In response to the person approving the subsequently captured behavioral data, the instructions when read and executed by the processor, further cause the electronic device to incorporate the subsequently captured behavioral modality data into a retraining routine to create an updated behavioral modality record for the person.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
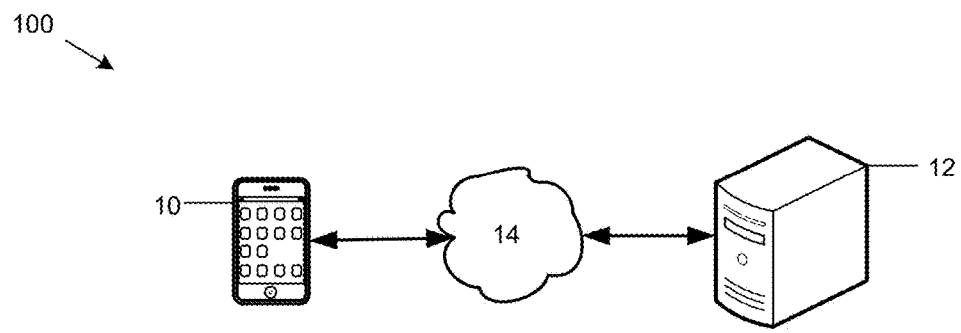
FIG. 1 is a schematic diagram of an example computing system for maintaining fidelity of a bond between a person and an artificial intelligence agent bound to the person according to an embodiment of the present disclosure.

FIG. 1 is a schematic diagram of an example computing system 100 for maintaining fidelity of a bond between a person and an artificial intelligence agent bound to the person according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who typically operates the device.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
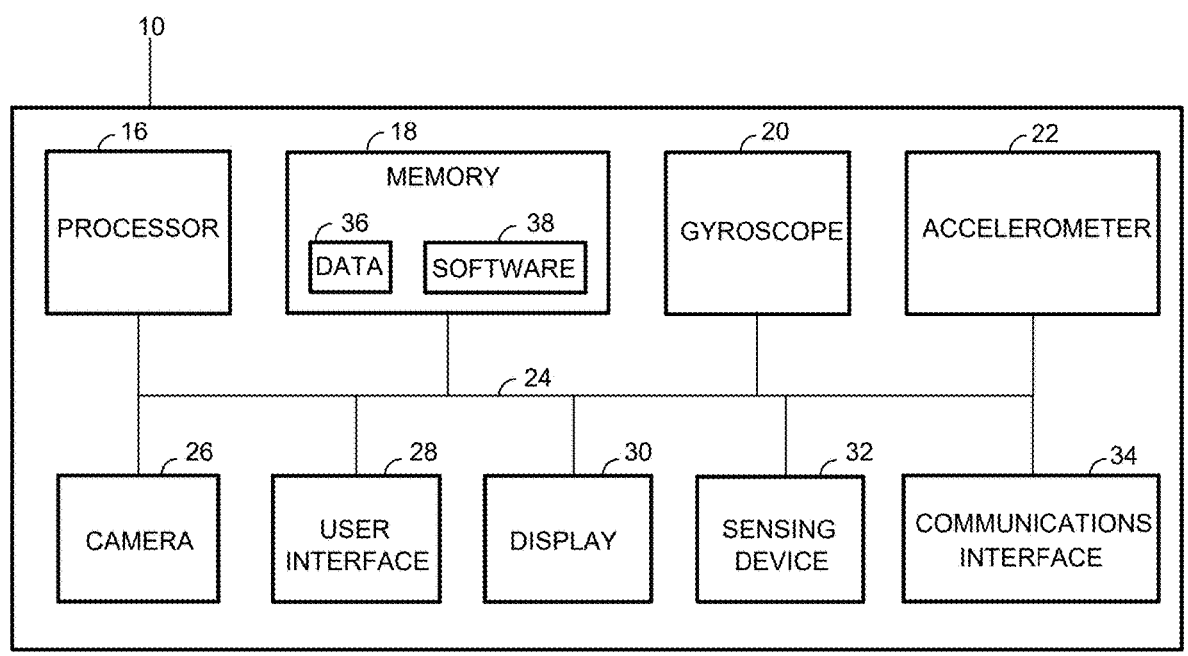
FIG. 2 is a more detailed schematic diagram illustrating an example electronic device in the system of FIG. 1.

FIG. 2 is a more detailed schematic diagram illustrating the example electronic device 10 used for maintaining fidelity of a bond between a person and an artificial intelligence agent bound to the person according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of people. Each data record is typically for a respective person. The data record for each person may include data such as, but not limited to, the name of the person, historical behavioral patterns of the person, preferences of the person, risk thresholds, raw behavioral modality data of the person collected over time, and templates representing the captured behavioral modality data of the person. Templates representing different behavioral modalities of a person may be referred to as record behavioral modality data of the person. Example behavioral modalities include, but are not limited to, keystroke dynamics, language-style embeddings, voice, mouse movement patterns, touch pressure dynamics on touch enabled devices, gait, and contextual data such as ambient audio data. Mouse movement patterns include, but are not limited to, cursor trajectories, click intervals, and movement velocity. Touch-pressure dynamics on touch-enabled devices include, for example, pressure intensity and dwell duration. Touch enabled devices may include, for example, smart devices and laptop computers.

The example methods and algorithms described herein may apply behavioral modality-specific threshold values and fusion algorithms to combine biometric modality data with keystroke, language, and voice inputs.

Personally identifiable information (PII) may be removed from the captured behavioral data to remove any connection between the person and the captured data. For example, keystroke timings may be converted into statistical summaries like mean key-hold duration, and voice biometric data may be reduced to Mel-Frequency Cepstral Coefficients.

Raw behavioral modality data can be encrypted, for example, using AES-256 encryption with keys managed within a hardware security module (HSM) (not shown). The raw behavioral modality data may alternatively be stored in a secure enclave within, for example, the processor 16 to prevent unauthorized access, even in the event that the electronic device 10 is compromised.

Keystroke dynamics may be measured, for example, over 1,000 key-hold events, yielding a mean key-hold duration ($\mu$) of 120 ms and a standard deviation ($\sigma$) of 15 ms. Alternatively, a rolling window of 50 new keystroke samples may be collected and an updated mean of 160 ms may be computed that constitutes a deviation of +40 ms or +2.67$\sigma$ from the stored baseline ($\mu$+2$\sigma$=[90 ms, 150 ms]).

Five hundred voice samples of a person speaking a fixed passphrase may be captured. A baseline pitch frequency of $\mu$=220 Hz with a standard deviation $\sigma$=10 Hz may be calculated from the speech and stored in the memory 18. Additionally, embeddings for 1,000 sample sentences may be computed using a Bidirectional Encoder Representations from Transformers (BERT) model and an average cosine similarity $\mu$=0.85 with a standard deviation $\sigma$=0.05 relative to a Baseline Persona Model of the person.

Behavioral data necessary for drift detection and Baseline Persona Model retraining only are collected. Retraining the Baseline Persona Model may also be referred to as updating the Baseline Persona Model. For instance, keystroke samples are limited to a rolling window, for example, fifty samples, and voice samples are capped at fifty per session. Changes in behavioral characteristics of a person which evolve over time are known as behavioral drift.

The behavioral modality data may be anonymized to remove personally identifiable information. For example, raw keystroke samples can be converted to statistical summaries like mean key-hold duration or inter-key latency distributions, and voice samples can be reduced to Mel Spectrum Cepstral Coefficient feature vectors stripped of identifiable audio content. Text input may be processed using a BERT model to generate language-style embeddings without retaining the original text. Anonymized data may be encrypted for transmission via the network 14. Anonymized metrics may be sent to the cloud. Raw behavioral modality data may remain in the memory 18 or may be deleted after processing in accordance with a configurable data retention policy. For example, the policy may indicate that the data is to be retained for thirty days, then deleted. The anonymized data may be sent via the network 14 to the cloud only for audit or synchronization purposes to enhance the security of the raw data.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs are software and include, but are not limited to, operating systems, Internet browser applications, enrolment applications, authentication applications, user liveness detection applications, secure cryptographic algorithms, for example, SHA-256, machine learning algorithms (MLA), Hidden Markov Models (HMM), Bidirectional encoder Representations from Transformers (BERT) models, Natural Language Processing programs, Baseline Persona Models, and any special computer program that manages the relationship between application software and any suitable variety of hardware that helps to make-up a computer system or computing environment. The software may also include computer programs that implement buffers and use RAM to store temporary data.

Authentication applications enable the electronic device 10 to conduct user verification and identification (1:N) transactions with any type of authentication data, where "N" is a number of candidates.

Machine learning models have parameters which are modified during training to optimize functionality of the models trained using a machine learning algorithm (MLA). Baseline Persona Models as described herein are machine learning models (MLMs) that encode the behavioral patterns or behavioral modality data of a person over time. Baseline Persona Models may be continuously retrained. Behavioral patterns or data used to retrain the Baseline Persona Model may be approved by the person before being used to retrain the Baseline Persona Model.

Baseline Persona Models can be implemented, for example, as Gaussian mixture models (GMM), Hidden Markov Models (HMM) for mouse movements, and as the centroid of language-style embeddings generated by Bidirectional encoder Representations from Transformers (BERT) models. Data associated with Baseline Persona Models includes, but is not limited to, HMM transition matrices, embedding centroids and associated thresholds. Thus, it should be understood that the Baseline Persona Model is a continuously-trained machine learning model capturing multi-modal behavioral parameters, for example, GMM, HMM, and embedding centroids.

A copy of the all the parameters of the Baseline Persona Model of a person taken at an instantaneous point-in-time may be referred to herein as a snapshot. A snapshot effectively freezes the Baseline Persona Model at a point in time and is obtained when the Baseline Persona Model is in an uncorrupted state. The snapshot can be used to facilitate resetting the Baseline Persona Model when the Baseline Persona Model changes beyond acceptable threshold values. Snapshots may be, for example, fifty keystroke timings or a short voice embedding. Snapshots typically are not stored in the memory 18. Rather, snapshots can be cryptographically hashed and assigned metadata.

Metadata includes, but is not limited to, timestamps and version numbers. The hash values are signed within a hardware security module (HSM) (not shown) and written to a permissioned immutable ledger to ensure tamper-evident lineage. An Immutable Ledger as described herein can be a tamper-evident data store or a permissioned blockchain, into which cryptographic hashes of snapshots, enrollment events, and policy updates are recorded. Additionally, or alternatively, the Immutable Ledger may be implemented using a distributed ledger based on Directed Acyclic Graph (DAG) structures, or a replicated, tamper-evident distributed database. Each ledger node may be operated by distinct organizational entities, for example, a compliance auditor or a security operations center to enhance trust.

If the Immutable Ledger is temporarily inaccessible due to, for example, network 14 issues the electronic device 10 may use a local caching mechanism to maintain operational continuity. Each electronic device in the system 100 may maintain a secure, encrypted cache of the most recent snapshot and its associated cryptographic hash, stored within a trusted execution environment (TEE). Upon detecting ledger inaccessibility, the cached snapshot may be retrieved for use. Once ledger connectivity is restored, any snapshot hashes or metadata writes generated during the inaccessibility period are synchronized. Integrity is verified by recomputing and comparing hashes against the cached values. If the cache is also unavailable, for example, due to device compromise, manual re-authentication is performed.

Natural Language Processing (NLP) programs facilitate detecting text in images that may have been generated using artificial intelligence. NLP programs can analyze language patterns, grammar, and context to identify text generated using artificial intelligence.

Hidden Markov Models (HMM), for example, may be used to analyze keystroke dynamics, including key-hold durations and inter-key latencies. The HMM models the sequence of keystroke events as a Markov process, where states represent characteristic typing patterns, for example, key-hold duration and key-press transitions, and observations correspond to captured metrics. For each rolling window of keystroke samples, for example, fifty key-press events, the HMM computes a log-likelihood score to assess the probability that the observed sequence aligns with the Baseline Persona Model of the person.

Natural language inputs, such as text composed by individuals, are processed to generate language-style embeddings using a transformer-based model, for example, a fine-tuned BERT model. The BERT model is trained using the historical text inputs of a person to produce a 768-dimensional embedding vector capturing syntactic and semantic patterns. The historical text inputs include, for example, emails and chat messages typed by the person.

Text captured, for example, by the electronic device 10, can be converted to an embedding vector. A similarity score can be computed between the embedding vector and an embedding vector derived from a person's behavioral modality data using, for example, cosine similarity. Captured voice biometric data can be analyzed using Mel-Frequency Cepstral Coefficients (MFCCs) to extract acoustic features, such as pitch, formant frequencies, and spectral characteristics. A Gaussian Mixture Model (GMM) can be used to model the distribution of MFCC features in captured behavioral modality data. For a rolling window of voice samples, for example, fifty (50) samples, the GMM can compute a likelihood score to evaluate alignment with the Baseline Persona Model.

Captured behavioral modality data may be compared against the Baseline Persona Model of a person in any manner. For example, cosine similarity may be used to compare captured behavioral modality data of a person against the Baseline Persona Model of the person across all modalities. For example, for keystroke dynamics, the HMM log-likelihood scores can be normalized to a [0, 1] range and treated as a similarity metric. For language-style embeddings, a cosine similarity is computed directly between the embedding vectors of the captured text and the Baseline Persona Model of a person. For voice-print features, the likelihood scores calculated by a Gaussian Mixture Model (GMM) are similarly normalized to enable comparison. Log-likelihood scores calculated by the HMM and GMM are normalized using min-max scaling to a [0, 1] range for consistent comparison across modalities. The cosine similarity score (S) is calculated as:

$$S = \frac{A \cdot B}{\|A\|\|B\|}$$

where A is the feature vector of captured behavioral data, and B is the feature vector of the Baseline Persona Model of the person.

The process of verifying the identity of a user is known as a verification transaction. Typically, during a verification transaction a biometric template is generated from biometric modality data of a user captured during the transaction. The generated biometric template is compared against the corresponding record biometric template of the user and a matching score is calculated for the comparison. If the matching score meets or exceeds a threshold score, the identity of the user is verified as true. Alternatively, the captured user biometric modality data may be compared against the corresponding record biometric modality data to verify the identity of the user.

An authentication data requirement is the biometric modality data desired to be captured during a verification or identification transaction. For the example methods described herein, the authentication data requirement may be face, finger, or any behavioral modality like keystroke dynamics.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either. The gyroscope 20 and accelerometers 22 may capture data for behavioral modalities such as, but not limited to, the gait of a person, swinging arms of a peraon, and other motion related activities.

The camera 26 captures image data. As used herein, capture means to record data temporarily or permanently, for example, multimedia data. The camera 26 can be one or more imaging devices configured to record images of identity documents of a user while utilizing the electronic device 10. Moreover, the camera 26 is capable of recording images under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10. The camera 26 may capture videos of a person moving.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The devices included in the interface 28 may collect multi-modal behavioral data that includes, for example, keystroke dynamic data, language-style embeddings, and voice-print feature data. A similarity score may be computed from the collected multi-modal behavioral data and compared against the Baseline Persona Model for the person.

The camera 26 can be considered a sensor in the electronic device 10. It is contemplated by the present disclosure that the electronic device 10 may include additional sensors (not shown) that may also capture data while the camera 26 captures image data. Such sensors include, but are not limited to, a sensor for detecting ambient light, a sensor for calculating global positioning coordinates (GPS) of the electronic device 10, and one or more magnetometers. For embodiments in which the camera 26 is external to the electronic device 10, such additional sensors may be included in the camera 26. Moreover, such an external camera 26 may include at least one microphone, speakers, accelerometers, and gyroscopes.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or information entered by a person can be captured and stored in the memory 18. The interface 28 may include adapters for chat platforms, web widgets, and mobile applications. Examples of chat platforms include, but are not limited to, Slack and Teams.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like, only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet.™. or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across a network between the electronic device 10 and any other device (not shown). The exchange of information may involve the transmission of radio frequency (RF) signals through an antenna (not shown).

The server 12 includes most of the same components as described herein with regard to the electronic device 10. However, because the server 12 is primarily stationary, not primarily mobile, the server 12 may not include the gyroscope 20 and/or the accelerometer 22.

Figure 3:
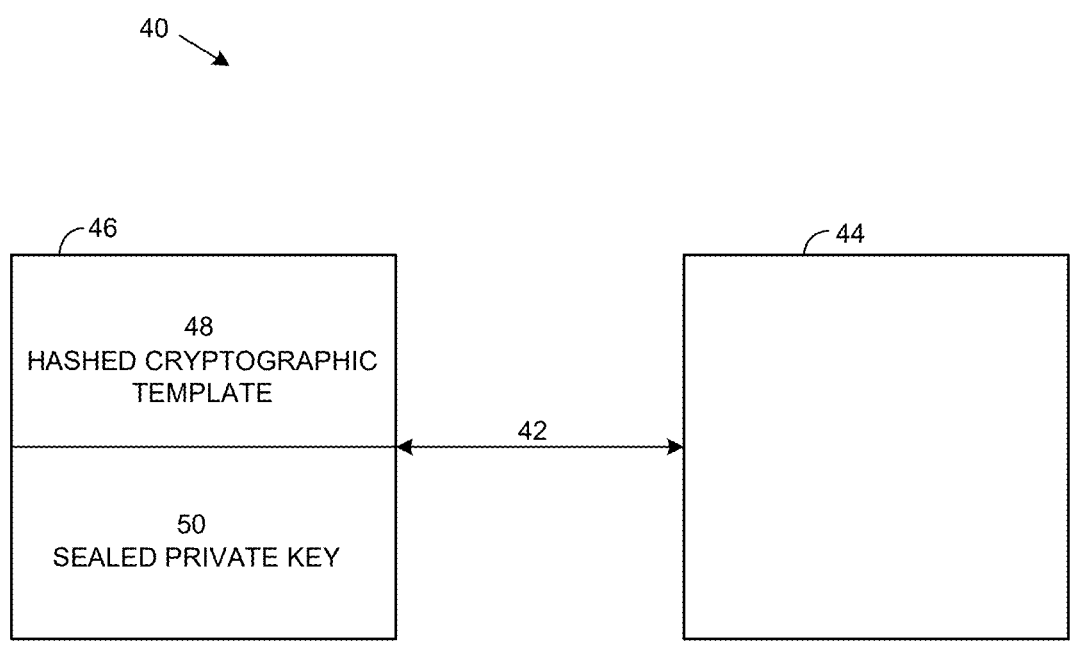
FIG. 3 is a diagram illustrating an example monitoring dashboard.

FIG. 3 is a simplified block diagram 40 illustrating a bond 42 between a person 44 that operates, for example, the electronic device 10 and an artificial intelligence (AI) agent 46. The AI agent 46 includes a hashed cryptographic template 48 and a sealed private key 50. The hashed cryptographic template 48 may be created during an enrollment process as the result of conducting an authentication transaction with, for example, biometric modality data captured from the person. The biometric modalities may include, for example, finger, voice and face. After the person is successfully authenticated, a biometric template is created from the captured biometric modality data. The template is hashed to form the hashed cryptographic template 48. The hashed cryptographic template 48 may be stored in a trusted execution environment (TEE) in, for example, the processor 16 or may be stored in a hardware security module (HSM) able to communicate with the electronic device 10 via the network 14.

Public/Private key cryptography may be used to create the bond 42 between the person 44 and the AI agent 46. More specifically, a public/private key pair can be created and the private key 50 can be stored, for example, within the TEE or in the HSM. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44. The bond 42 is thus created between the person 44 and the AI agent 46. It should be understood that the person 44 is the human owner to whom the AI agent 46 is bound.

The public key, the hashed cryptographic template 48, and associated metadata are written to an Immutable Ledger to create an auditable record that the AI agent 46 is bound to the person 44. It is contemplated by the present disclosure that by virtue of binding the AI agent 46 to the person 44, the person 44 possesses exclusive rights over the credentials and models associated with the AI agent 46. The credentials can include, for example, the hashed cryptographic template 48 and the sealed private key 50. The models can include, for example, the Baseline Persona Model and the snapshot. As described herein, sealed indicates that the private key 50 cannot be removed from the TEE, or the HSM, in encrypted form and can be unlocked upon a successful authentication transaction. Thus, the sealed private key 50 is a HSM/TEE protected key bound to the hashed cryptographic template 48.

Although the hashed cryptographic template 48 is created from biometric modality data as described herein, it is contemplated by the present disclosure that the hashed cryptographic template 48 may alternatively be created from any other type of security credential, for example, a pass phrase or a physical token.

The AI agent 46 does not include raw authentication data, for example, captured biometric modality data or pass phrases.

It is contemplated by the present disclosure that the AI agent 46 thus bonded to the person 44 is authorized to represent and execute behavioral data, preferences and actions of the person 44 on behalf of the person 44. However, the private key 50 is to be unlocked before the AI agent 46 is permitted to conduct any transaction on behalf of the person 44. The private key 50 is unlocked and able to be accessed when biometric data captured from an individual operating the electronic device 10 is successfully authenticated against the hashed cryptographic template 48. A successful authentication indicates that the individual operating the electronic device 10 is the person 44.

After the AI agent 46 is bound to the person 44, the AI agent 46 may perform pre-approved tasks on behalf of the person 44, for example, sending scheduled emails. Typically, there is a finite time for executing such scheduled tasks. However, if the AI agent 46 fails to timely execute the task, the AI agent 46 is not permitted to conduct additional tasks on behalf of the person 44 until the person 44 is again successfully biometrically authenticated. This prevents the AI agent 46 from continuously operating without re-validating the presence of the person 44. The AI agent 46 may monitor the behavioral modality data and/or patterns of the person 44. As those patterns are exhibited through interactions the AI agent 46 orchestrates on behalf of the person 44.

Artificial intelligence powered assistants and chatbots have been increasingly employed to perform a broad range of digital tasks on behalf of individuals. Examples of tasks include, but are not limited to, calendar management, email composition, transaction authorization, and data retrieval. Conventionally, such artificial intelligence powered assistants are bound to a person's identity via a one-time enrollment procedure, for example, password authentication, physical token validation, or biometric authentication. Once bound, the artificial intelligence powered assistant typically relies on this static credential binding or, at best, periodic re-authentication to maintain trust.

However, such one-time enrollment procedures are known to be vulnerable to session hijacking, credential compromise, and deepfake attacks that can circumvent one-time or scheduled re-verification checks. Moreover, such systems are typically not updated to account for changes in behavioral characteristics of a person which evolve over time. Such behavioral changes are known as behavioral drift. Existing artificial intelligence assistants typically lack robust, real-time mechanisms to detect drift in the behavioral characteristics of a person. As a result, such systems are known to operate on outdated or corrupted data which can expose systems to unauthorized actions or require overly aggressive re-authentication policies that degrade user experience with excessive interruptions.

Efforts to address behavioral drift in conventional systems typically involve manual retraining workflows or infrequent batch updates. These approaches introduce latency between drift detection and model correction, incur significant administrative overhead, and risk human error in retraining outcomes. Moreover, current governance frameworks often fail to provide fine-grained, tamper-evident audit trails that link each agent action to an authorized human owner, complicating compliance with regulatory requirements and auditor demands.

To address these problems the electronic device 10 can capture data for behavioral modalities of a person, calculate a score for each behavioral modality, calculate a similarity score from the calculated scores, and compare the similarity score against the threshold value. In response to determining the similarity score fails to satisfy the threshold value, the electronic device 10 can substitute a snapshot of a Baseline Persona Model of the person for the Baseline Persona Model. The Baseline Persona Model is a machine learning model that encodes the behavioral modality data of a person over time. The snapshot is a copy of the Baseline Persona Model at an instant in time. The electronic device 10 can subsequently capture data for the behavioral modalities of the person over time and retrain, using a set of the subsequently captured data approved by the person, the Baseline Persona Model.

Figure 4:
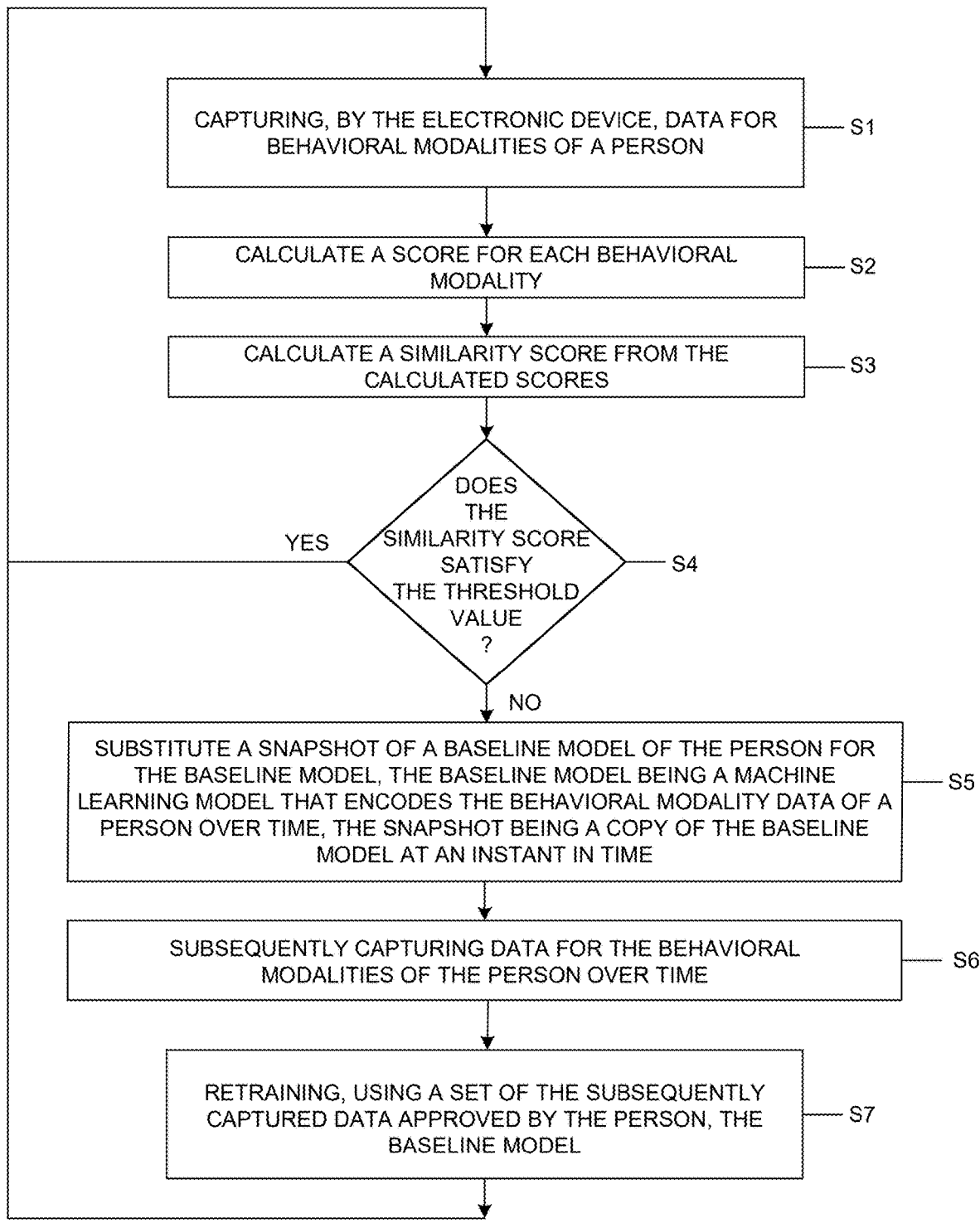
FIG. 4 is a diagram illustrating an example method and algorithm for maintaining fidelity of a bond between a person and an artificial intelligence agent bound to the person according to an embodiment of the present disclosure.

FIG. 4 is a diagram illustrating an example method and algorithm for maintaining the fidelity of a bond between a person and an artificial intelligence agent bound to the person according to an embodiment of the present disclosure. FIG. 4 illustrates example steps performed when the electronic device 10 runs software 38 stored in the memory 18 to enhance detection of behavioral data changes as exhibited by an artificial intelligence agent.

In step S1, the software 38 executed by the processor 16 causes the electronic device 10 to capture data for behavioral modalities of a person operating the electronic device 10. Example behavioral modalities include, but are not limited to, keystroke dynamics, natural language inputs, and voice. Keystroke dynamics may include, for example, key-hold durations and inter-key latencies. The behavioral modality data may be captured in real time over a period of time.

Personally identifiable information (PII) may be removed from the captured behavioral data. Doing so removes any connection between the person and the captured data and thus anonymizes the captured behavioral data. For example, keystroke timings may be converted into statistical summaries like mean key-hold duration, and voice biometric data may be reduced to Mel-Frequency Cepstral Coefficients. The anonymized captured behavioral data may be encrypted using AES-256 within a trusted execution environment in, for example, the processor 16 to ensure security at the point of capture.

In step S2, the software 38 executed by the processor 16 causes the electronic device 10 to calculate a score for each behavioral modality. Thus, a score may be computed for the keystroke dynamics, natural language inputs, and voice.

The keystroke dynamics may be analyzed using, for example, a Hidden Markov Model (HMM). The HMM models the sequence of keystroke events as a Markov process, where states represent characteristic typing patterns, for example, key-hold duration and key-press transitions, and observations correspond to captured metrics. The keystroke dynamics can be obtained in rolling windows of keystrokes, for example, 50 key-press events. The HMM can compute, for example, a log-likelihood score to assess the probability that a sequence of captured keystrokes aligns with the Baseline Persona Model of the person.

Natural language inputs, for example, text composed by individuals, are processed to generate language-style embeddings using a transformer-based model, for example, a fine-tuned BERT model. The BERT model is trained using the historical text inputs of a person to produce a 768-dimension embedding vector capturing syntactic and semantic patterns. The historical text inputs include, for example, emails and chat messages typed by the person.

Natural language text typed can be captured by, for example, the electronic device 10 and can be converted into an embedding vector. A natural language similarity score can be computed against an embedding of the Baseline Persona Model using, for example, cosine similarity.

Captured voice biometric data can be analyzed using Mel-Frequency Cepstral Coefficients (MFCCs) to extract acoustic features, such as pitch, formant frequencies, and spectral characteristics. A Gaussian Mixture Model (GMM) can be used to model a distribution of MFCC features for captured voice biometric data. For a rolling window of voice samples, for example, fifty (50) samples per window, the GMM computes a likelihood score to evaluate alignment with the Baseline Persona Model of the person.

In step S3, the software 38 executed by the processor 16 causes the electronic device 10 to calculate a similarity score from the calculated scores. It is contemplated by the present disclosure that the similarity score may be calculated in any manner that facilitates accurately detecting changes in captured behavioral modality data of a person that may indicate the fidelity between, for example, the person 44 and the AI agent 46 has been compromised. For example, the similarity score may be calculated using cosine similarity. Using cosine similarity facilitates comparing the calculated scores across all modalities against the threshold score in a single operation.

For cosine similarity, the log-likelihood score calculated for the captured keystroke dynamics and the likelihood score calculated for the voice biometric data are normalized. The normalized scores and the natural language similarity score can be used to calculate a feature vector for the captured behavioral modality data. The cosine similarity score (S) is calculated from the following equation:

$$S = \frac{A \cdot B}{\|A\|\|B\|}$$

where A is the feature vector of the captured behavioral modality data, and B is a feature vector calculated for the Baseline Persona Model of the person.

Next, in step S4, the software 38 executed by the processor 16 causes the electronic device 10 to compare the similarity score S against a threshold value. When the similarity score S satisfies the threshold value, in step S1, the software 38 executed by the processor 16 causes the electronic device 10 to continue capturing data for biometric modalities of the person. However, when the similarity score fails to satisfy the threshold value, in step S5, the software 38 executed by the processor 16 causes the electronic device 10 to substitute a snapshot of the Baseline Persona Model for the Baseline Persona Model of the person.

The threshold value as described herein may be a range, for example, two standard deviations ($\mu+2\sigma$) from the mean similarity score of the corresponding record behavioral modality data of the person, where $\mu$ is the mean similarity score and $\sigma$ is the standard deviation computed from the Baseline Persona Model of the person. The similarity score fails to satisfy the threshold score when the similarity score falls outside the range of ($\mu+2\sigma$) from the mean similarity score. Not satisfying the threshold value indicates that the captured biometric modality data deviates by an unacceptable amount from the Baseline Persona Model. Using a range as a threshold facilitates detecting changes in the behavior of a person while accounting for natural variations in the behavior of the person. Such natural variations may result from, for example, aging or injury.

Next, in step S6, the software 38 executed by the processor 16 causes the electronic device 10 to subsequently capture data for the behavioral modalities of the person over time. The subsequently captured data may be, for example, fifty anomalous samples. In step S7, the software 38 executed by the processor 16 causes the electronic device 10 to notify the person that the subsequently captured behavioral modality data is ready for review. The electronic device 10 may notify the person by, for example, a dashboard alert, an email message, or a short message service associated with the person. In response, the person may operate the electronic device 10 to review the subsequently captured data.

The electronic device 10 displays the subsequently captured data for the user to see and review. The person may review the samples and approve using a set of the captured data, for example, forty of the fifty samples. The electronic device 10 retrains the Baseline Persona Model of the person using the approved set of behavioral modality data. For example, for keystroke dynamics, the HMM can be updated by re-estimating transition and emission probabilities using the Baum-Welch algorithm, incorporating keystroke samples in the approved set. For language-style embeddings, the BERT model can be fine-tuned using a gradient descent-based optimization with a cross-entropy loss function, leveraging the approved text samples to adjust the embedding weights. For voice-print features, the GMM can be retrained using the Expectation-Maximization (EM) algorithm to update the mixture parameters based on approved voice samples. Retraining the Baseline Persona Model ensures that the Baseline Persona Model reflects the person's current behavioral patterns while maintaining fidelity of the bond 42.

Retraining the Baseline Persona Model using the algorithms described above enables precise, real-time monitoring and correction of behavioral drift, ensuring that, for example, the fidelity of the bond 42 is maintained. The use of standardized models, for example, HMM, BERT, and GMM as well as cosine similarity facilitates interoperability with existing identity verification frameworks while providing a robust foundation for enterprise-grade deployment. Retraining the Baseline Persona Model updates the Baseline Persona Model.

After retraining the Baseline Persona Model, another snapshot is created from the retrained model. The snapshot is cryptographically hashed and recorded to the Immutable Ledger as an updated snapshot. It is contemplated by the present disclosure that during retraining the AI agent 46 is restricted to conducting low-risk tasks, for example, read-only calendar access, until the Baseline Persona Model is fully retrained.

Next, in step S1, the software 38 executed by the processor 16 causes the electronic device 10 to continue capturing data for behavioral modalities of the person 44. Thus, the example method and algorithm described herein continuously monitors the behavioral modality data of the person 44 for changes that may indicate the fidelity of the bond 42 between the person 44 and an AI agent 46 has been compromised.

Although a similarity score (S) across all the behavioral modalities is used to determine whether the threshold value is satisfied, it is contemplated by the present disclosure that the different scores calculated for the different behavioral modalities may alternatively be used. More specifically, the different scores can be compared against a respective threshold value and if any one of the different scores fails to satisfy the respective threshold value the Baseline Persona Model of the person should be updated.

For example, for the keystroke dynamics behavioral data, the calculated log-likelihood scores may be compared against a keystroke threshold value. The keystroke threshold value can be defined as two standard deviations ($\mu+2\sigma$) from the mean log-likelihood of the record behavioral modalities of the person, where $\mu$ is the mean log-likelihood and $\sigma$ is the standard deviation computed from the record behavioral modalities of the person. When the log-likelihood score does not satisfy the keystroke threshold value, the captured biometric modality data deviates by an unacceptable amount from the record biometric modality data. As a result, the Baseline Persona Model should be retrained. Retraining the Baseline Persona Model updates the Baseline Persona Model. The keystroke threshold value may not be satisfied when the log-likelihood score falls outside of the range of $\mu+2\sigma$.

For natural language inputs, the natural language similarity score can be compared against a natural language threshold value. The natural language threshold value can be defined as two standard deviations from the mean cosine similarity ($\mu+2\sigma$), where $\mu$ is the mean cosine similarity and $\sigma$ is the standard deviation derived from the Baseline Persona Model of the person. Not satisfying the natural language threshold value indicates that the captured behavioral modality data deviates by an unacceptable amount from the Baseline Persona Model. As a result, the Baseline Persona Model should be retrained. Retraining the Baseline Persona Model updates the Baseline Persona Model. The natural language threshold value may not be satisfied when the natural language similarity score falls outside of the range of $\mu+2\sigma$.

For voice behavioral data, the likelihood score can be compared against a voice threshold value. The voice threshold value may be defined as two standard deviations from the mean likelihood ($\mu+2\sigma$), where $\mu$ is the mean likelihood and $\sigma$ is the standard deviation of the Baseline Persona Model. Not satisfying the voice threshold value indicates that the captured biometric modality data deviates by an unacceptable amount from the Baseline Persona Model. As a result, the Baseline Persona Model should be retrained. Retraining the Baseline Persona Model updates the Baseline Persona Model. The voice threshold value may not be satisfied when the likelihood score falls outside of the range of $\mu+2\sigma$.

The example methods and algorithms described herein may apply behavioral modality-specific threshold values and fusion algorithms to combine biometric modality data with keystroke, language, and voice inputs.

Although the example methods and systems described herein include a Baseline Persona Model stored in, for example, the electronic device 10, it is contemplated by the present disclosure that federated learning techniques may be leveraged to have different devices collaboratively update a shared global Baseline Persona Model without exchanging raw behavioral data. Baseline Persona Model updates may be aggregated via secure multi-party computation or homomorphic encryption to further protect user privacy.

It is contemplated by the present disclosure that upon collecting behavioral data for and generating the Baseline Persona Model, an AI agent-specific Verifiable Credential (VC) can be obtained from a trusted issuer. The VC cryptographically binds the snapshot associated with the AI agent to a Decentralized Identifier (DID). Before execution of any payment transaction, the AI agent presents its VC to the payment network, for example, VISA Intelligent Commerce or Open Banking rails, which verifies the signature and metadata against a decentralized registry. The AI agent's transactions are thereby cryptographically linked to the VC, enabling downstream spend limits and merchant-category enforcement.

Using the methods and algorithms for maintaining the fidelity of a bond between a person and an AI agent bound to the person as described herein enables enhancing detection of a person's behavioral changes to enhance security against spoofing and drift-related errors while preserving a seamless experience for the person. As a result, AI assistants are facilitated to be deployed for critical operations with confidence in ongoing identity binding and trustworthiness transactions. Moreover, the methods and algorithms facilitate enhancing a reduction in risks associated with conducting different kinds of network-based transactions.

It is contemplated by the present disclosure that the example methods and algorithms described herein may be conducted entirely by the electronic device 10, partly by the electronic device 10 and partly by the server 12, entirely by the server 12, or by any other combination of other servers (not shown), electronic devices (not shown), or computers (not shown) operable to communicate with the electronic device 10 via the network 14. Furthermore, data described herein as being stored in the electronic device 10 may alternatively, or additionally, be stored in any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of maintaining fidelity of a bond between a person and an artificial intelligence agent bound to the person comprising the steps of:
    obtaining a snapshot of a Baseline Persona Model of a person, the Baseline Persona Model being a machine learning model that encodes data for different behavioral modalities of the person over time, the snapshot being a copy of the Baseline Persona Model at an instant in time and including parameters for each of the different behavioral modalities of the person;
    generating, for each of the different behavioral modalities, a corresponding cryptographic hash of the parameters for the respective behavioral modality, each cryptographic hash being associated with metadata;
    signing each cryptographic hash within a hardware security module;
    writing the signed cryptographic hashes and associated metadata to an Immutable Ledger, the Immutable Ledger being a permissioned blockchain accessible to authorized auditors;
    capturing, by an electronic device, data for behavioral modalities of the person;
    calculating a score for each of the captured behavioral modalities;
    calculating a similarity score from the calculated scores;
    comparing the similarity score against a threshold value;
    in response to determining the similarity score fails to satisfy the threshold value, substituting the snapshot for the Baseline Persona Model of the person;
    subsequently capturing data for the behavioral modalities of the person over time; and
    retraining, using a set of the subsequently captured data approved by the person, the Baseline Persona Model.

2. The method according to claim 1, wherein the captured behavioral modalities comprise at least one of:
    keystroke dynamics;
    mouse movement;
    language style embeddings derived from textual inputs of the person; and
    voice print features of the person.

3. The method according to claim 1, further comprising notifying the person when the similarity score fails to satisfy the threshold value and upon initiation of said retraining step.

4. The method according to claim 3, wherein said notifying comprises delivering the notification via at least one of an in-application dashboard alert, an email message, or a short message service associated with the person.

5. The method according to claim 1, wherein the threshold value is a statistical deviation of two standard deviations from a mean of the Baseline Persona Model.

6. The method according to claim 1, said retraining step comprising;
    reviewing, by the person, the subsequently captured behavioral modality data; and
    in response to the person approving the subsequently captured behavioral modality data, incorporating the subsequently captured behavioral modality data into a retraining routine to update the Baseline Persona Model of the person.

7. An electronic device for maintaining the fidelity of a bond between a person and an artificial intelligence agent bound to the person comprising:
    a processor; and
    a memory configured to store data, said electronic device being associated with a network and said memory being in communication with said processor and having instructions stored thereon which, when read and executed by said processor, cause said electronic device to:
    obtain a snapshot of a Baseline Persona Model of a person, the Baseline Persona Model being a machine learning model that encodes data for different behavioral modalities of the person over time, the snapshot being a copy of the Baseline Persona Model at an instant in time and including parameters for each of the different behavioral modalities of the person;
    generate, for each of the different behavioral modalities, a corresponding cryptographic hash of the parameters for the respective behavioral modality, each cryptographic hash being associated with metadata;

sign each cryptographic hash within a hardware security module;
write the signed cryptographic hashes and associated metadata to an Immutable Ledger, the Immutable Ledger being a permissioned blockchain accessible to authorized auditors;
capture data for behavioral modalities of the person;
calculate a score for each of the captured behavioral modalities;
calculate a similarity score from the calculated scores;
compare the similarity score against a threshold value;
in response to determining the similarity score fails to satisfy the threshold value, substitute the snapshot for the Baseline Persona Model of the person;
subsequently capture data for the behavioral modalities of the person over time; and
retrain, using a set of the subsequently captured data approved by the person, the Baseline Persona Model.

8. The electronic device according to claim 7, wherein the captured behavioral modalities comprise at least one of:
keystroke dynamics;
mouse movement;
language style embeddings derived from textual inputs of the person; and
voice print features of the person.

9. The electronic device according to claim 7, wherein the instructions when read and executed by said processor, further cause said electronic device to notify the person when the similarity score fails to satisfy the threshold value and upon initiation of said retraining step.

10. The electronic device according to claim 9, wherein the instructions when read and executed by said processor, further cause said electronic device to deliver the notification via at least one of an in-application dashboard alert, an email message, or a short message service associated with the person.

11. The electronic device according to claim 9, wherein the threshold value is a statistical deviation of two standard deviations from a mean of the Baseline Persona Model.

12. The electronic device according to claim 7, wherein the instructions when read and executed by said processor, further cause said electronic device to:
present the subsequently captured behavioral modality data for review by the person; and
in response to the person approving the subsequently captured behavioral modality data, incorporating the subsequently captured behavioral modality data into a retraining routine to update the Baseline Persona Model of the person.

13. A non-transitory computer-readable recording medium in an electronic device for maintaining the fidelity of a bond between a person and an artificial intelligence agent bound to the person, the non-transitory computer-readable recording medium storing instructions which when executed by a hardware processor cause the hardware processor to perform steps comprising:
obtaining a snapshot of a Baseline Persona Model of a person, the Baseline Persona Model being a machine learning model that encodes data for different behavioral modalities of the person over time, the snapshot being a copy of the Baseline Persona Model at an instant in time and including parameters for each of the different behavioral modalities of the person;
generating, for each of the different behavioral modalities, a corresponding cryptographic hash of the parameters for the respective behavioral modality, each cryptographic hash being associated with metadata;
signing each cryptographic hash within a hardware security module;
writing the signed cryptographic hashes and associated metadata to an Immutable Ledger, the Immutable Ledger being a permissioned blockchain accessible to authorized auditors;
capturing data for behavioral modalities of the person;
calculating a score for each of the captured behavioral modalities;
calculating a similarity score from the calculated scores;
comparing the similarity score against a threshold value;
in response to determining the similarity score fails to satisfy the threshold value, substituting the snapshot for the Baseline Persona Model of the person;
subsequently capturing data for the behavioral modalities of the person over time; and
retraining, using a set of the subsequently captured data approved by the person, the Baseline Persona Model.

14. The non-transitory computer-readable recording medium according to claim 13, wherein the captured behavioral modalities comprise at least one of:
keystroke dynamics;
mouse movement;
language style embeddings derived from textual inputs of the person; and
voice print features of the person.

15. The non-transitory computer-readable recording medium according to claim 13, wherein the instructions when read and executed by said hardware processor, further cause said hardware processor to perform the step comprising notifying the person when the similarity score fails to satisfy the threshold value and upon initiation of said retraining step.

16. The non-transitory computer-readable recording medium according to claim 13, wherein the threshold value is a statistical deviation of two standard deviations from a mean of the Baseline Persona Model.

17. The non-transitory computer-readable recording medium according to claim 13, wherein the instructions when read and executed by said hardware processor, further cause said hardware processor to perform steps comprising:
presenting the subsequently captured behavioral modality data for review by the person; and
in response to the person approving the subsequently captured behavioral modality data, incorporating the subsequently captured behavioral modality data into a retraining routine to update the Baseline Persona Model of the person.

* * * * *